(12) United States Patent
Hwang

(10) Patent No.: US 7,163,027 B2
(45) Date of Patent: Jan. 16, 2007

(54) AIR TAP ASSEMBLY

(76) Inventor: Mike Hwang, 7019, Abbottswood Dr., Rancho Palo Verdes, CA (US) 90275

( * ) Notice: Subject to any disclaimer, the term of this patent is extended or adjusted under 35 U.S.C. 154(b) by 233 days.

(21) Appl. No.: 10/894,518

(22) Filed: Jul. 20, 2004

(65) Prior Publication Data

US 2006/0016493 A1   Jan. 26, 2006

(51) Int. Cl.
*F16K 7/18* (2006.01)
(52) U.S. Cl. ............................ 137/625.28; 137/625.33
(58) Field of Classification Search ............... 137/225, 137/625.28, 625.31, 625.33, 351, 349, 859
See application file for complete search history.

(56) References Cited

U.S. PATENT DOCUMENTS

| | | | | |
|---|---|---|---|---|
| 1,539,127 A | * | 5/1925 | Lipman | ................... 137/512.1 |
| 4,098,294 A | * | 7/1978 | Woods | ................... 137/625.31 |
| 4,554,948 A | * | 11/1985 | Bergmann | ............. 137/625.31 |
| 4,848,403 A | * | 7/1989 | Pilolla et al. | ........... 137/625.31 |
| 5,676,173 A | * | 10/1997 | Conrad et al. | .............. 137/896 |
| 6,257,269 B1 | * | 7/2001 | Wu | ............................ 137/224 |
| 6,877,524 B1 | * | 4/2005 | Vasilev | ........................ 137/528 |
| 2002/0036015 A1 | * | 3/2002 | Miyajima et al. | ...... 137/543.23 |

* cited by examiner

*Primary Examiner*—Eric Keasel
*Assistant Examiner*—Cloud Lee
(74) *Attorney, Agent, or Firm*—Alan D. Kamrath; Nikolai & Mersereau, P.A.

(57) ABSTRACT

An air tap assembly includes a mounting seat, a gasket, a connecting member, and an end cap. Thus, the sealing portion of the first mounting cap of the connecting member is rested on the gasket to interrupt the connection between the vent holes of the first mounting cap of the connecting member and the passage of the mounting seat, thereby preventing the air contained in the air cushion from leaking outward from the air tap assembly, so that the air tap assembly has an anti-reverse effect to prevent the air from leaking outward from the air cushion, thereby facilitating a user inflating the air cushion.

17 Claims, 4 Drawing Sheets

AIR TAP ASSEMBLY

BACKGROUND OF THE INVENTION

1. Field of the Invention

The present invention relates to an air tap assembly, and more particularly to an air tap assembly having an anti-reverse effect.

2. Description of the Related Art

A conventional air tap is mounted on an air cushion (or mattress) to introduce air into the air cushion by an inflator or in a manual manner so as to inflate the air cushion. However, the conventional air tap does not have an anti-reverse effect, so that the air is introduced through the air tap to flow outward from the air cushion freely, thereby greatly causing inconvenience to a user when inflating the air cushion.

SUMMARY OF THE INVENTION

In accordance with the present invention, there is provided an air tap assembly, comprising a mounting seat, a gasket, a connecting member, and an end cap, wherein:

the mounting seat has an inside formed with a passage and has an end formed with a mounting portion;

the gasket is mounted in the mounting portion of the mounting seat;

the connecting member is rotatably mounted on the mounting seat and includes a first mounting cap rotatably mounted on the mounting portion of the mounting seat, and a second mounting cap mounted on the first mounting cap;

the first mounting cap of the connecting member has a closed wall having a periphery formed with a plurality of vent holes each communicating with the passage of the mounting seat and having a side formed with a sealing portion rested on the gasket;

the second mounting cap of the connecting member has a closed wall having a periphery formed with a plurality of vent holes communicating with the vent holes of the first mounting cap of the connecting member; and the end cap is mounted on the second mounting cap of the connecting member and has a peripheral wall formed with a plurality of conducting channels communicating with the vent holes of the second mounting cap of the connecting member.

The primary objective of the present invention is to provide an air tap assembly having an anti-reverse effect to prevent air from leaking outward from the air cushion during the inflating process.

Another objective of the present invention is to provide an air tap assembly, wherein the sealing portion of the first mounting cap of the connecting member is rested on the gasket to interrupt the connection between the vent holes of the first mounting cap of the connecting member and the passage of the mounting seat, thereby preventing the air contained in the air cushion from leaking outward from the air tap assembly, so that the air tap assembly has an anti-reverse effect to prevent the air from leaking outward from the air cushion, thereby facilitating a user inflating the air cushion.

Further benefits and advantages of the present invention will become apparent after a careful reading of the detailed description with appropriate reference to the accompanying drawings.

DETAILED DESCRIPTION OF THE INVENTION

Figure 1:
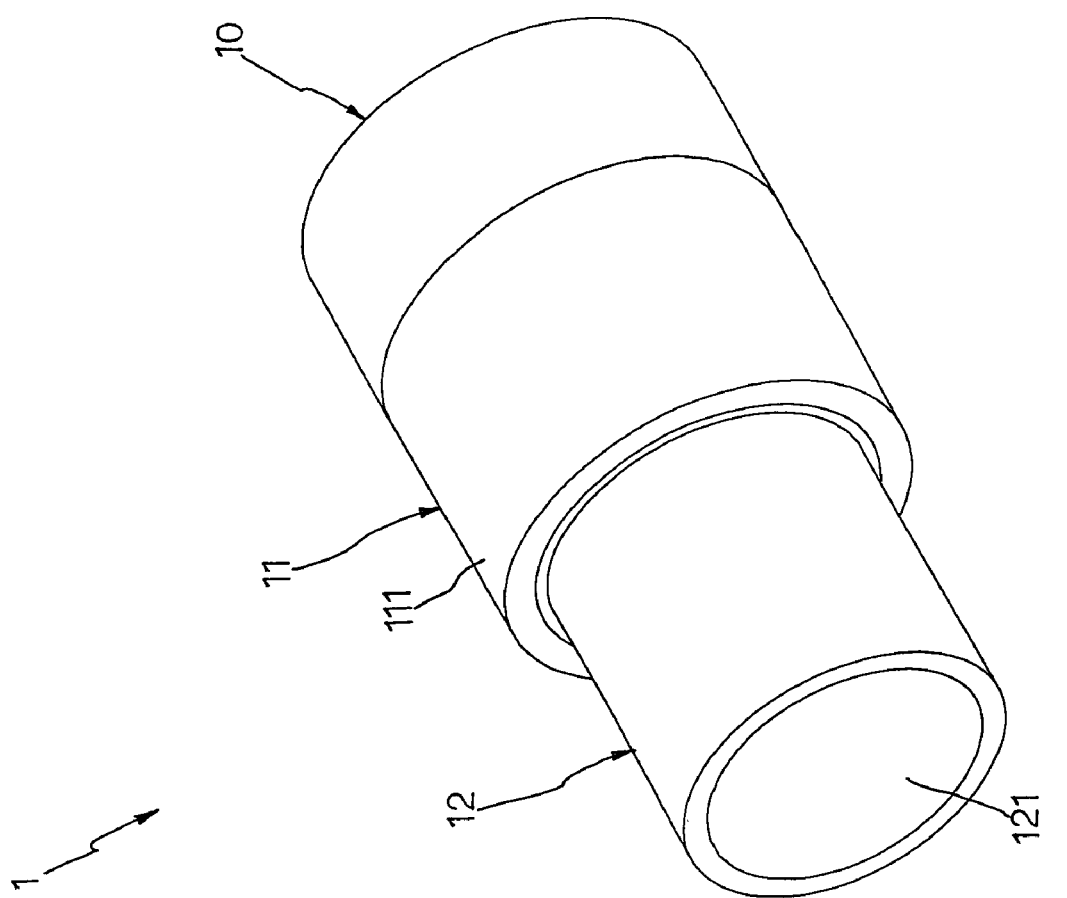
FIG. 1 is a perspective view of an air tap assembly in accordance with the preferred embodiment of the present invention.

Referring to the drawings and initially to FIGS. 1–4, an air tap assembly 1 in accordance with the preferred embodiment of the present invention comprises a mounting seat 12, a connecting member 1, and an end cap 10.

The mounting seat 12 has a stepped cylindrical shape and has an inside formed with a passage 121 longitudinally extended through a whole length of the mounting seat 12. The mounting seat 12 has an end formed with a mounting portion 122.

A gasket 125 is mounted in the mounting portion 122 of the mounting seat 12. The mounting portion 122 of the mounting seat 12 has a first end extended from the end of the mounting seat 12 and formed with an outer thread 126 and a second end having a stepped inner wall for mounting the gasket 125 and an outer wall formed with an annular flexible stop flange 124 radially extended outward therefrom.

The connecting member 11 is rotatably mounted on the mounting seat 12 and includes a cylindrical first mounting cap 112 rotatably mounted on the mounting portion 122 of the mounting seat 12, and a cylindrical second mounting cap 111 closely mounted on the first mounting cap 112. Preferably, the first mounting cap 112 and the second mounting cap 111 of the connecting member 11 are integrally combined with each other during the manufacturing process.

The first mounting cap 112 of the connecting member 11 has a closed wall having a periphery formed with a plurality of vent holes 1121 each communicating with the passage 121 of the mounting seat 12 and having a side formed with a sealing portion 1122 rested on the gasket 125. Preferably, the vent holes 1121 of the first mounting cap 112 of the connecting member 11 are arranged in an annular manner.

Figure 4:
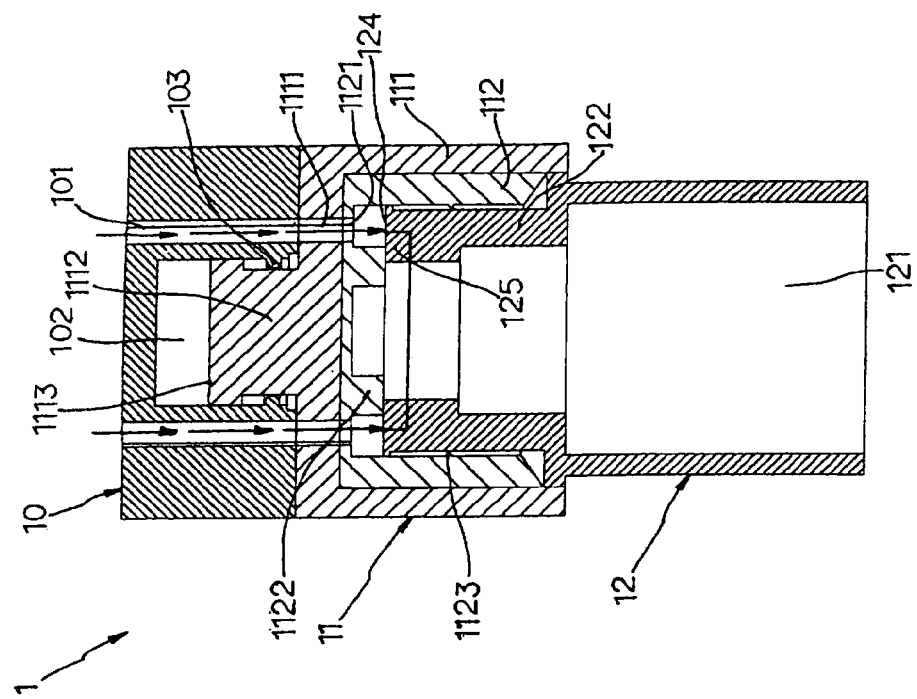
FIG. 4 is a plan cross-sectional view of the air tap assembly as shown in FIG. 1.
Figure 5:
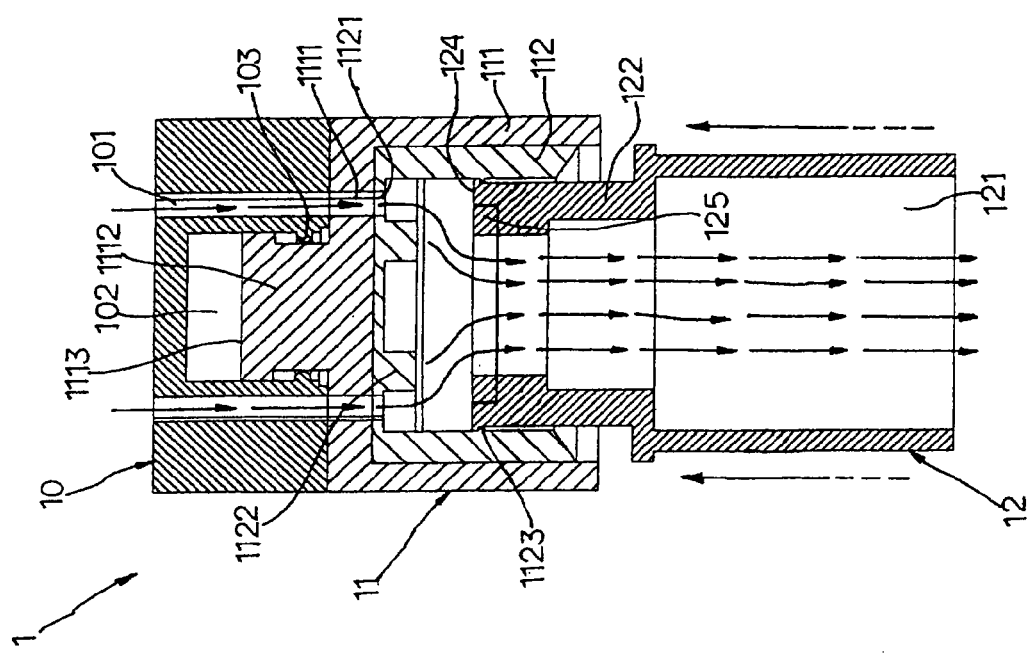
FIG. 5 is a schematic operational view of the air tap assembly as shown in FIG. 4.

The first mounting cap 112 of the connecting member 11 is movable relative to the mounting portion 122 of the mounting seat 12 between a first position as shown in FIG. 4 where the sealing portion 1122 of the first mounting cap 112 of the connecting member 11 is rested on the gasket 125 to interrupt a connection between the vent holes 1121 of the first mounting cap 112 of the connecting member 11 and the passage 121 of the mounting seat 12 and a second position as shown in FIG. 5 where the sealing portion 1122 of the first mounting cap 112 of the connecting member 11 is detached from the gasket 125 so that the vent holes 1121 of the first mounting cap 112 of the connecting member 11 are connected to the passage 121 of the mounting seat 12.

The first mounting cap 112 of the connecting member 11 has an inside formed with an inner thread 1124 screwed onto the outer thread 126 of the mounting portion 122 of the mounting seat 12. The inside of the first mounting cap 112 of the connecting member 11 is formed with an annular limit rib 1123 that is movable to abut the stop flange 124 of the mounting seat 12 to prevent the first mounting cap 112 of the connecting member 11 from being moved outward excessively relative to the mounting portion 122 of the mounting seat 12.

The second mounting cap 111 of the connecting member 11 has a closed wall having a periphery formed with a plurality of vent holes 1111 communicating with the vent holes 1121 of the first mounting cap 112 of the connecting member 11. Preferably, the vent holes 1111 of the second mounting cap 111 of the connecting member 11 are arranged in an annular manner. The closed wall of the second mounting cap 111 of the connecting member 11 has a side formed with a mounting portion 1112. The mounting portion 1112 of the second mounting cap 111 of the connecting member 11 has a distal end formed with an annular flexible stop flange 1113 radially extended outward therefrom.

The end cap 10 is mounted on the second mounting cap 111 of the connecting member 11 and has a peripheral wall formed with a plurality of conducting channels 101 communicating with the vent holes 1111 of the second mounting cap 111 of the connecting member 11. Preferably, the conducting channels 101 of the end cap 10 are arranged in an annular manner, and each of the conducting channels 101 of the end cap 10 is longitudinally extended through a whole length of the end cap 10.

The end cap 10 has an inside formed with a mounting recess 102 mounted on the mounting portion 1112 of the second mounting cap 111 of the connecting member 11. The mounting recess 102 of the end cap 10 has an end formed with an annular limit rib 103 that is movable to abut the stop flange 1113 of the mounting portion 1112 of the second mounting cap 111 to prevent the end cap 10 from being moved outward excessively relative to the mounting portion 1112 of the second mounting cap 111 of the connecting member 11.

Figure 2:
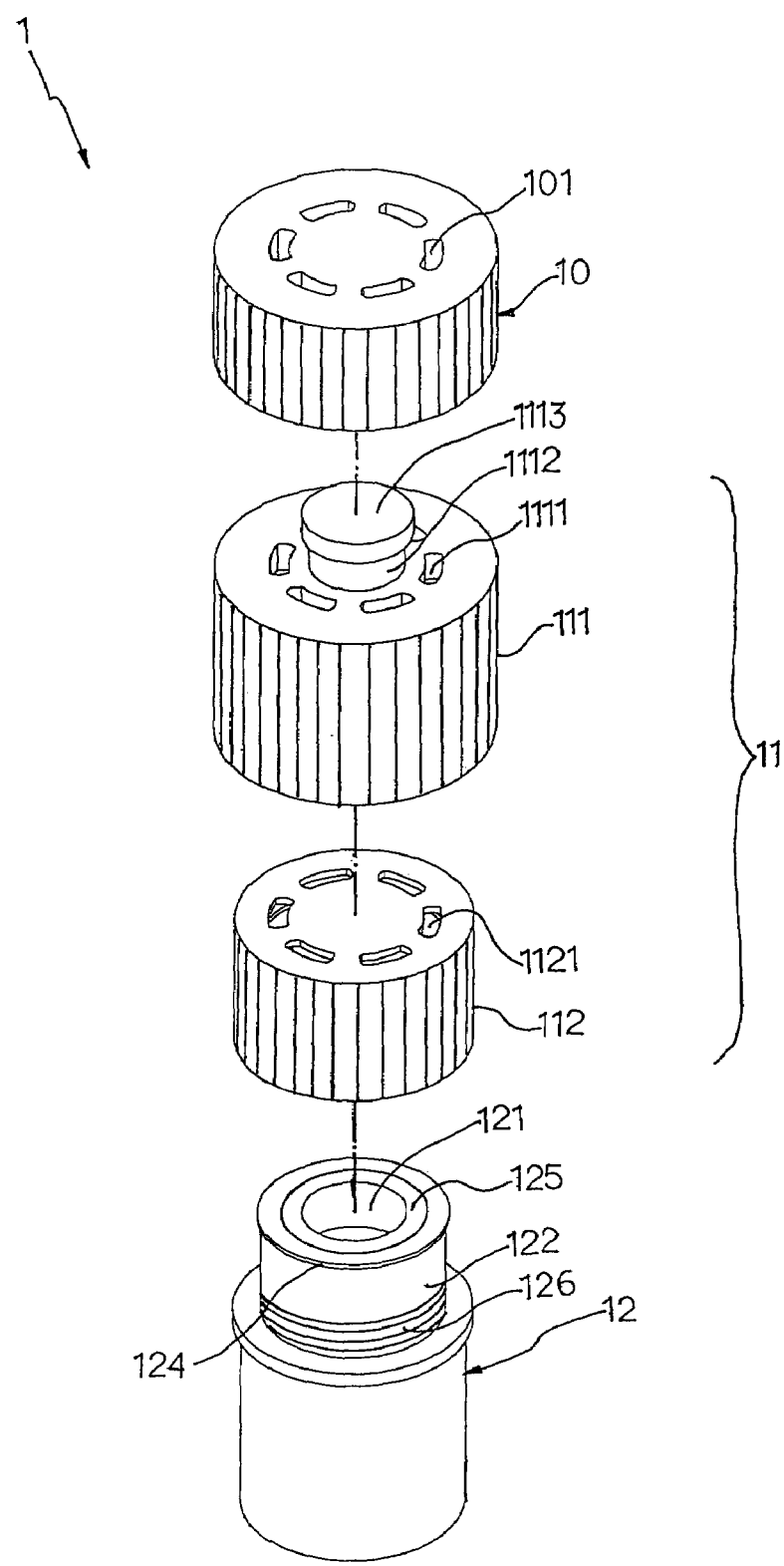
FIG. 2 is an exploded perspective view of the air tap assembly as shown in FIG. 1.
Figure 3:
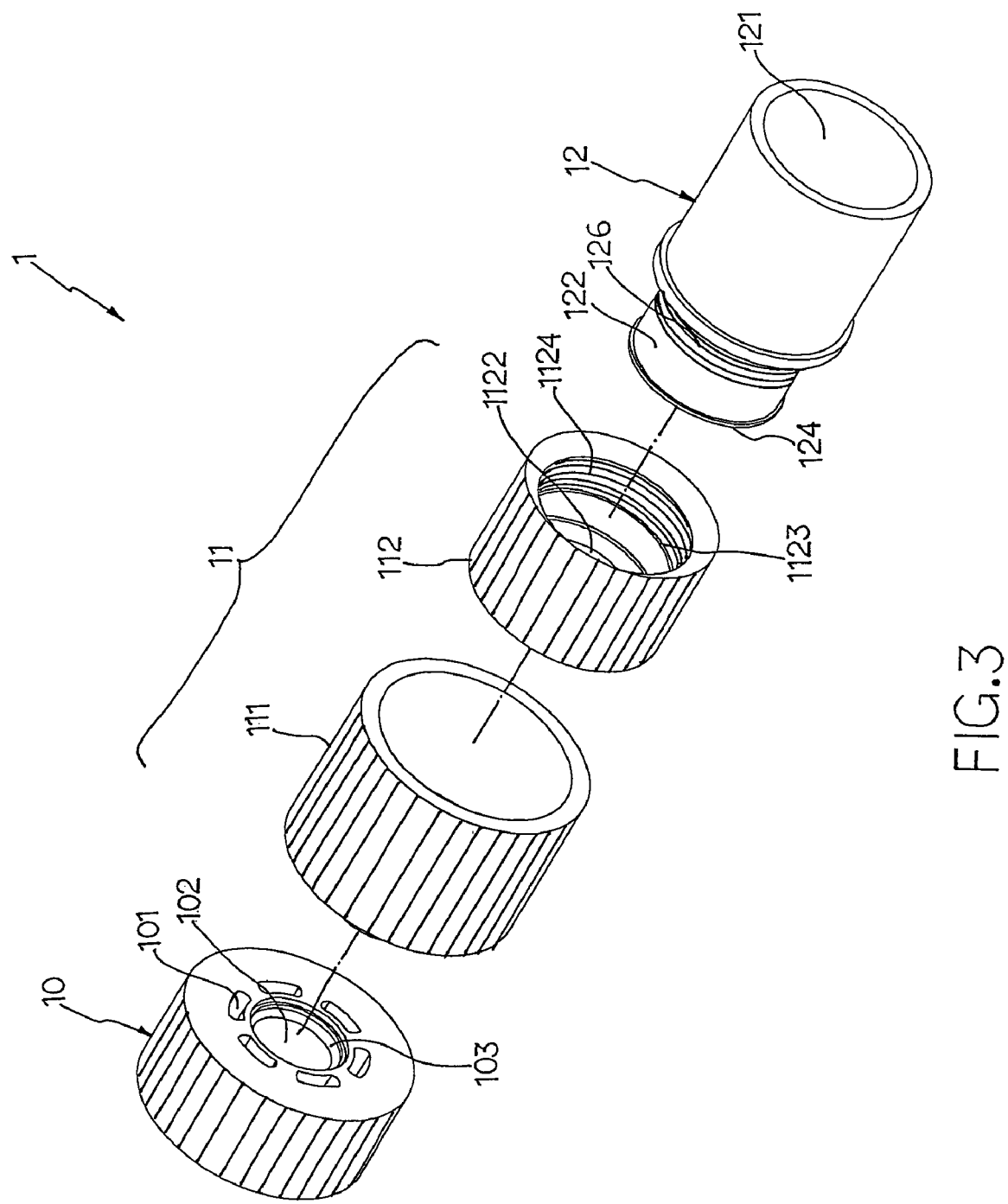
FIG. 3 is an exploded perspective view of the air tap assembly as shown in FIG. 1.

In operation, referring to FIGS. 4 and 5 with reference to FIGS. 1–3, the air tap assembly 1 is mounted on an air cushion (not shown), with the mounting seat 12 being mounted to a corner of the air cushion to introduce air into the air cushion so as to inflate the air cushion. In addition, an air valve (not shown) is mounted to the other corner of the air cushion to introduce the air outward from the air cushion so as to deflate the air cushion.

As shown in FIG. 4, the first mounting cap 112 of the connecting member 11 is screwed onto the mounting portion 122 of the mounting seat 12, and the sealing portion 1122 of the first mounting cap 112 of the connecting member 11 is rested on the gasket 125 to interrupt the connection between the vent holes 1121 of the first mounting cap 112 of the connecting member 11 and the passage 121 of the mounting seat 12, so that air of the ambient environment cannot be introduced through the passage 121 of the mounting seat 12 into the air cushion.

As shown in FIG. 5, the first mounting cap 112 of the connecting member 11 is unscrewed from the mounting portion 122 of the mounting seat 12 to detach the sealing portion 1122 of the first mounting cap 112 of the connecting member 11 from the gasket 125, so that the vent holes 1121 of the first mounting cap 112 of the connecting member 11 are connected to the passage 121 of the mounting seat 12, thereby allowing the air of the ambient environment to flow through the passage 121 of the mounting seat 12 into the air cushion.

In such a manner, the air of the ambient environment is introduced into the conducting channels 101 of the end cap 10 by an inflator or in a manual manner, so that the air of the ambient environment in turn flows through the conducting channels 101 of the end cap 10, the vent holes 1111 of the second mounting cap 111 of the connecting member 11, the vent holes 1121 of the first mounting cap 112 of the connecting member 11 and the passage 121 of the mounting seat 12 into the air cushion as shown in FIG. 5 so as to inflate the air cushion rapidly.

After the inflating process is finished or paused, the first mounting cap 112 of the connecting member 11 is again screwed onto the mounting portion 122 of the mounting seat 12, so that the sealing portion 1122 of the first mounting cap 112 of the connecting member 11 is moved to press the gasket 125 to interrupt the connection between the vent holes 1121 of the first mounting cap 112 of the connecting member 11 and the passage 121 of the mounting seat 12, thereby preventing the air contained in the air cushion from leaking outward from the air tap assembly 1.

Accordingly, the sealing portion 1122 of the first mounting cap 112 of the connecting member 11 is rested on the gasket 125 to interrupt the connection between the vent holes 1121 of the first mounting cap 112 of the connecting member 11 and the passage 121 of the mounting seat 12, thereby preventing the air contained in the air cushion from leaking outward from the air tap assembly 1, so that the air tap assembly 1 has an anti-reverse effect to prevent the air from leaking outward from the air cushion, thereby facilitating a user inflating the air cushion.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An air tap assembly, comprising a mounting seat, a gasket, a connecting member, and an end cap, wherein:

the mounting seat has an inside formed with a passage and has an end formed with a mounting portion, wherein the mounting portion of the mounting seat has a first end with an outer thread extended from the end of the mounting seat and a second end having a stepped inner wall;

the gasket is mounted to the stepped inner wall in the mounting portion of the mounting seat;

the connecting member is rotatably mounted on the mounting seat and includes a first mounting cap rotatably mounted on the mounting portion of the mounting seat, and a second mounting cap mounted on the first mounting cap, wherein the first mounting cap of the connecting member has an inside formed with an inner thread screwed onto the outer thread of the mounting portion of the mounting seat;

the first mounting cap of the connecting member has a closed wall having a periphery formed with a plurality of vent holes each communicating with the passage of the mounting seat and having a side formed with a sealing portion rested on the gasket;

the second mounting cap of the connecting member has a closed wall having a periphery formed with a plurality of vent holes communicating with the vent holes of the first mounting cap of the connecting member; and the end cap is mounted on the second mounting cap of the connecting member and has a peripheral wall formed with a plurality of conducting channels communicating with the vent holes of the second mounting cap of the connecting member.

2. The air tap assembly in accordance with claim 1, wherein the mounting portion of the mounting seat has a second end having an outer wall formed with an annular flexible stop flange radially extended outward therefrom, and the inside of the first mounting cap of the connecting member is formed with an annular limit rib that is movable to abut the stop flange of the mounting seat to prevent the first mounting cap of the connecting member from being moved outward excessively relative to the mounting portion of the mounting seat.

3. The air tap assembly in accordance with claim 1, wherein the first mounting cap and the second mounting cap of the connecting member are integrally combined with each other.

4. The air tap assembly in accordance with claim 1, wherein the first mounting cap of the connecting member is movable relative to the mounting portion of the mounting seat between a first position where the sealing portion of the first mounting cap of the connecting member is rested on the gasket to interrupt a connection between the vent holes of the first mounting cap of the connecting member and the passage of the mounting seat and a second position where the sealing portion of the first mounting cap of the connecting member is detached from the gasket so that the vent holes of the first mounting cap of the connecting member are connected to the passage of the mounting seat.

5. The air tap assembly in accordance with claim 1, wherein the vent holes of the first mounting cap of the connecting member are arranged in an annular manner.

6. The air tap assembly in accordance with claim 1, wherein the vent holes of the second mounting cap of the connecting member are arranged in an annular manner.

7. The air tap assembly in accordance with claim 1, wherein the closed wall of the second mounting cap of the connecting member has a side formed with a mounting portion, and the end cap has an inside formed with a mounting recess mounted on the mounting portion of the second mounting cap of the connecting member.

8. The air tap assembly in accordance with claim 7, wherein the mounting portion of the second mounting cap of the connecting member has a distal end formed with an annular flexible stop flange radially extended outward therefrom, and the mounting recess of the end cap has an end farmed with an annular limit rib that is movable to abut the stop flange of the mounting portion of the second mounting cap to prevent the end cap from being moved outward excessively relative to the mounting portion of the second mounting cap of the connecting member.

9. The air tap assembly in accordance with claim 1, wherein the conducting channels of the end cap are arranged in an annular manner.

10. The air tap assembly in accordance with claim 1, wherein each of the conducting channels of the end cap is longitudinally extended through a whole length of the end cap.

11. The air tap assembly in accordance with claim 1, wherein the mounting seat has a stepped cylindrical shape.

12. The air tap assembly in accordance with claim 1, wherein the passage is longitudinally extended through a whole length of the mounting seat.

13. The air tap assembly in accordance with claim 1, wherein the first mounting cap of the connecting member has a cylindrical shape.

14. The air tap assembly in accordance with claim 1, wherein the second mounting cap of the connecting member has a cylindrical shape.

15. An air tap assembly, comprising a mounting seat, a gasket, a connecting member, and an end cap, wherein:
  the mounting seat has an inside formed with a passage and has an end formed with a mounting portion;
  the gasket is mounted in the mounting portion of the mounting seat;
  the connecting member is rotatably mounted on the mounting seat and includes a first mounting cap rotatably mounted on the mounting portion of the mounting seat, and a second mounting cap mounted on the first mounting cap;
  the first mounting cap of the connecting member has a closed wall having a periphery formed with a plurality of vent holes each communicating with the passage of the mounting seat and having a side formed with a sealing portion rested on the gasket;
  the second mounting cap of the connecting member has a closed wall having a periphery formed with a plurality of vent holes communicating with the vent holes of the first mounting cap of the connecting member; and
  the end cap is mounted on the second mounting cap of the connecting member and has a peripheral wall formed with a plurality of conducting channels communicating with the vent holes of the second mounting cap of the connecting member;
  wherein the closed wall of the second mounting cap of the connecting member has a side formed with a mounting portion, and the end cap has an inside formed with a mounting recess mounted on the mounting portion of the second mounting cap of the connecting member.

16. The air tap assembly in accordance with claim 15, wherein the mounting portion of the second mounting cap of the connecting member has a distal end formed with an annular flexible stop flange radially extended outward therefrom, and the mounting recess of the end cap has an end formed with an annular limit rib that is movable to abut the stop flange of the mounting portion of the second mounting cap to prevent the end cap from being moved outward excessively relative to the mounting portion of the second mounting cap of the connecting member.

17. An air tap assembly, comprising a mounting seat, a gasket, a connecting member, and an end cap, wherein:
  the mounting seat has an inside formed with a passage and has an end formed with a mounting portion, wherein the mounting portion of the mounting seat has a first end extended from the end of the mounting seat and formed with an outer thread;
  the gasket is mounted in the mounting portion of the mounting seat;
  the connecting member is rotatably mounted on the mounting seat and includes a first mounting cap rotatably mounted on the mounting portion of the mounting seat, and a second mounting cap mounted on the first mounting cap, wherein the first mounting cap of the connecting member has an inside formed with an inner thread screwed onto the outer thread of the mounting portion of the mounting seat;
  the first mounting cap of the connecting member has a closed wall having a periphery formed with a plurality of vent holes each communicating with the passage of the mounting seat and having a side formed with a sealing portion rested on the gasket;
  the second mounting cap of the connecting member has a closed wall having a periphery formed with a plurality of vent holes communicating with the vent holes of the first mounting cap of the connecting member; and the end cap is mounted on the second mounting cap of the connecting member and has a peripheral wall formed with a plurality of conducting channels communicating with the vent holes of the second mounting cap of the connecting member the gasket is mounted, wherein the mounting portion of the mounting seat has a second end having an outer wall formed with an annular flexible stop flange radially extended outward therefrom, and the inside of the first mounting cap of the connecting member is formed with an annular limit rib that is movable to abut the stop flange of the mounting seat to prevent the first mounting cap of the connecting member from being moved outward excessively relative to the mounting portion of the mounting seat.

* * * * *